United States Patent
Wang et al.

(10) Patent No.: US 9,619,894 B2
(45) Date of Patent: Apr. 11, 2017

(54) SYSTEM AND METHOD FOR ESTIMATING VEHICLE DYNAMICS USING FEATURE POINTS IN IMAGES FROM MULTIPLE CAMERAS

(71) Applicant: GM GLOBAL TECHNOLOGY OPERATIONS LLC, Detroit, MI (US)

(72) Inventors: Jinsong Wang, Troy, MI (US); Wende Zhang, Troy, MI (US); Bakhtiar B. Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 28 days.

(21) Appl. No.: 14/710,364

(22) Filed: May 12, 2015

(65) Prior Publication Data
US 2015/0332098 A1    Nov. 19, 2015

Related U.S. Application Data

(60) Provisional application No. 61/994,686, filed on May 16, 2014.

(51) Int. Cl.
| | |
|---|---|
| *G06K 9/00* | (2006.01) |
| *G06T 7/20* | (2017.01) |
| *G06T 7/00* | (2017.01) |
| *G06K 9/32* | (2006.01) |

(52) U.S. Cl.
CPC ........ *G06T 7/2033* (2013.01); *G06K 9/00791* (2013.01); *G06K 9/3241* (2013.01); *G06T 7/0042* (2013.01); *G06T 7/0071* (2013.01); *G06T 2207/10016* (2013.01); *G06T 2207/30252* (2013.01)

(58) Field of Classification Search
CPC ............. G06K 9/00791; G06K 9/3241; G06T 7/0042; G06T 2207/10016; G06T 7/0071
USPC ......................................................... 382/103
See application file for complete search history.

(56) References Cited

U.S. PATENT DOCUMENTS 9,247,214 B2 *   1/2016  Aoki ....................... G06T 7/002
2013/0293717 A1  11/2013 Zhang et al.

OTHER PUBLICATIONS

Knorr, Moritz, et al. "Online Extrinsic Multi-Camera Calibration Using Ground Plane Induced Homographies" IEEE Intelligent Vehicles Symposium (IV), Gold Coast, Australia, Jun. 23-26, 2013, pp. 236-241.

(Continued)

*Primary Examiner* — Gregory F Cunningham
(74) *Attorney, Agent, or Firm* — John A. Miller; Miller IP Group, PLC

(57) ABSTRACT

A system and method for estimating dynamics of a mobile platform by matching feature points in overlapping images from cameras on the platform, such as cameras in a surround-view camera system on a vehicle. The method includes identifying overlap image areas for any two cameras in the surround-view camera system, identifying common feature points in the overlap image areas, and determining that the common feature points in the overlap image areas are not at the same location. The method also includes estimating three-degree of freedom vehicle dynamic parameters from the matching between the common feature points, and estimating vehicle dynamics of one or more of pitch, roll and height variation using the vehicle dynamic parameters.

20 Claims, 4 Drawing Sheets

(56) References Cited

OTHER PUBLICATIONS

Jeong, Jaeheon et al. "Trinocular Visual Odometry for Divergent Views with Minimal Overlap" IEEE, 2013, pp. 229-236, 2013.

* cited by examiner

SYSTEM AND METHOD FOR ESTIMATING VEHICLE DYNAMICS USING FEATURE POINTS IN IMAGES FROM MULTIPLE CAMERAS

CROSS-REFERENCE TO RELATED APPLICATIONS

This application claims the benefit of the priority date of U.S. Provisional Patent Application Ser. No. 61/994,686, titled, Surround-View Camera System (VPM) and Vehicle Dynamic, filed May 16, 2014.

BACKGROUND OF THE INVENTION

Field of the Invention

This invention relates generally to a system and method for estimating dynamics of a mobile platform and, more particularly, to a system and method for estimating vehicle dynamics by matching feature points in overlapping images from cameras in a surround-view camera system on a vehicle.

Discussion of the Related Art

Modern vehicles generally include one or more cameras that provide back-up assistance, take images of the vehicle driver to determine driver drowsiness or attentiveness, provide images of the road as the vehicle is traveling for collision avoidance purposes, provide structure recognition, such as roadway signs, etc. Other vehicle vision applications include vehicle lane sensing systems to sense the vehicle travel lane and drive the vehicle in the lane-center. Many of these known lane sensing systems detect lane-markers on the road for various applications, such as lane departure warning (LDW), lane keeping (LK), lane centering (LC), etc., and have typically employed a single camera, either at the front or rear of the vehicle, to provide the images that are used to detect the lane-markers.

It has been proposed in the art to provide a surround-view camera system on a vehicle that includes a front camera, a rear camera and left and right side cameras, where the camera system generates a top-down view of the vehicle and surrounding areas using the images from the cameras, and where the images overlap each other at the corners of the vehicle. The top-down view can be displayed for the vehicle driver to see what is surrounding the vehicle for back-up, parking, etc. Future vehicles may not employ rearview mirrors, but may instead include digital images provided by the surround view cameras.

U.S. Patent Application Publication No. 2013/0293717 to Zhang et al., filed Apr. 9, 2013, titled, Full Speed Lane Sensing With A Surrounding View System, assigned to the assignee of this application and herein incorporated by reference, discloses a system and method for providing lane sensing on a vehicle by detecting roadway lane-markers, where the system employs a surround-view camera system providing a top-down view image around the vehicle. The method includes detecting left-side and right-side lane boundary lines in the top-down view image, and then determining whether the lane boundary lines in the image are aligned from image frame to a next image frame and are aligned from image to image in the top-down view image.

For many camera-based vehicle applications it is critical to accurately calibrate the position and orientation of the camera with respect to the vehicle. Camera calibration generally refers to estimating a number of camera parameters including both intrinsic and extrinsic parameters, where the intrinsic parameters include focal length, optical center, radial distortion parameters, etc., and the extrinsic parameters include camera location, camera orientation, etc. Camera extrinsic parameters calibration typically involves determining a set of parameters that relate camera image coordinates to vehicle coordinates and vice versa. Some camera parameters, such as camera focal length, optical center, etc., are stable, while other parameters, such as camera orientation and position, are not. For example, the height of the camera depends on the load of the vehicle, which will change from time to time.

In the known surround-view camera systems, the images from the cameras overlap at the corners of the vehicle, where the camera calibration process "stitches" the adjacent images together so that common elements in the separate images directly overlap with each other to provide the desired top-down view. During manufacture of the vehicle, these camera images are stitched together to provide this image using any of a number of calibration techniques so that when the vehicle is first put into service, the cameras are properly calibrated. One calibration technique employed is to position the vehicle on a checker-board pattern of alternating light and dark squares where each point of the squares is suitably identified. Using these points in the developed images allows the camera calibration software to correct the position of the images so that overlapping points in adjacent images are identified at the same location.

However, once the vehicle is put into service various things may occur that could cause the orientation and position of the cameras to change, where the calibration of the camera includes errors causing misalignment in the top-down image. These things may include loading of the vehicle that causes camera position, such as height, and/or camera orientation, such as pitch, to change relative to world coordinates, small impacts to the vehicle which may change the position and orientation of the cameras, etc. However, current video processing modules (VPM) that process the images from the cameras to generate the top-down view are unable to recalibrate the cameras online while the vehicle is in use. Contrary, the vehicle operator must take the vehicle to a dealer or other authorized service center that has the ability to recalibrate the cameras in the same manner as was done during vehicle manufacture, which has obvious drawbacks.

SUMMARY OF THE INVENTION

The present disclosure describes a system and method for estimating dynamics of a mobile platform by matching feature points in overlapping images from cameras on the platform, such as cameras in a surround-view camera system on a vehicle. The method includes identifying overlap image areas for any two cameras in the surround-view camera system, identifying common feature points in the overlap image areas, and determining that common feature points in the overlap image areas are not at the same location. The method also includes estimating three-degree of freedom vehicle dynamic parameters from the matching between the common feature points, and estimating vehicle dynamics of one or more of pitch, roll and height variation using the vehicle dynamic parameters.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for estimating vehicle dynamics by matching feature points in overlapping images from cameras in a surround-view camera system on a vehicle. For example, as discussed, the system and method has particular application for estimating vehicle dynamics on a vehicle. However, as will be appreciated by those skilled in the art, the system and method may have application for other mobile platforms, such as on trains, machines, tractors, boats, recreation vehicles, etc.

Figure 1:
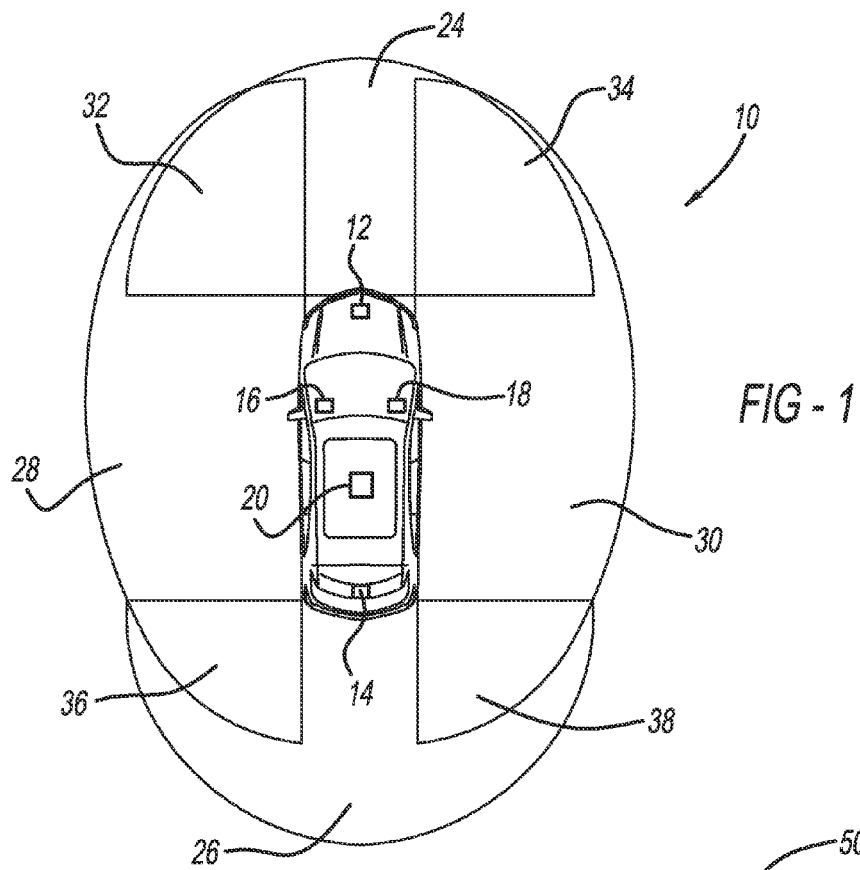
FIG. 1 is an illustration of a vehicle including a surround-view camera system having multiple cameras.

FIG. 1 is a top illustration of a vehicle 10 including a surround-view camera system having a front-view camera 12, a rear-view camera 14, a left-side driver view camera 16 and a right-side passenger view camera 18. The cameras 12-18 can be any camera suitable for the purposes described herein, many of which are known in the automotive art, that are capable of receiving light, or other radiation, and converting the light energy to electrical signals in a pixel format using, for example, charged coupled devices (CCD). The cameras 12-18 generate frames of image data at a certain data frame rate that can be stored for subsequent image processing in a video processing module (VPM) 20. The cameras 12-18 can be mounted within or on any suitable structure that is part of the vehicle 10, such as bumpers, facie, grill, side-view mirrors, door panels, etc., as would be well understood and appreciated by those skilled in the art. In one non-limiting embodiment, the side cameras 16 and 18 are mounted under the side view mirrors and are pointed downwards.

The cameras 12-18 generate images of certain limited areas around the vehicle 10 that partially overlap. Particularly, area 24 is the image area for the camera 12, area 26 is the image area for the camera 14, area 28 is the image area for the camera 16, and area 30 is the image area for the camera 18, where area 32 is an overlap area of the images 24 and 28, area 34 is an overlap area of the images 24 and 30, area 36 is an overlap area of the images 28 and 26, and area 38 is an overlap area of the images 30 and 26. Image data from the cameras 12-18 is sent to the VPM 20 that processes the image data to stitch the images together that can then be displayed on a vehicle display as a single top-down view image around the vehicle 10. Software algorithms are known that employ rotation matrices R and translation vectors t to orient and reconfigure the images from adjacent cameras so that the images properly overlap.

Vehicle dynamics, i.e., pitch, roll and height variation, influence the orientation of the images 24-30 from the cameras 12-18. For example, the vehicle 10 may pitch down during vehicle braking, may pitch up during hard accelerations, may roll sideways during turns, may pitch up or down during vehicle loading, etc., which may cause the images from the cameras 12-18 to change relative to each other even though the cameras are properly calibrated.

The present invention proposes a system and method for integrating information available from sensors on the vehicle about the vehicle dynamics into the algorithm in the VPM 20 that determines the surround-view image using the cameras 12-18 so the image can be corrected based on those changes to the vehicle dynamics. Generally, the proposed camera correction technique defines three coordinate systems, namely, a world coordinate system, a vehicle coordinate system and a camera coordinate system each defined in an X-Y-Z positional orientation.

Figure 2:
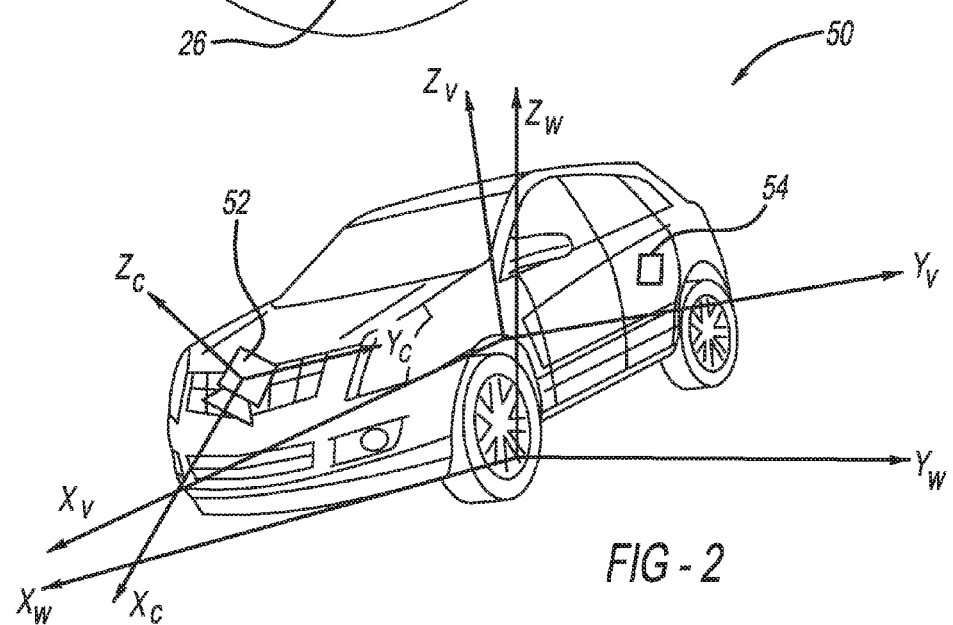
FIG. 2 is an isometric view of a vehicle showing a coordinate system for world coordinates, vehicle coordinates and camera coordinates.

FIG. 2 is an illustration of a vehicle 50 including a camera 52 showing these coordinates systems, where the subscript V represents the vehicle coordinates, the subscript W represents the world coordinates and the subscript C represents the camera coordinates. The vehicle 50 includes a sensor 54 intended to represent all of the available sensors on any particular vehicle that can sense vehicle pitch, height variation and roll and provide signals on the vehicle bus identifying vehicle dynamics.

Equations (1)-(3) below represent the stationary orientation of the surround-view camera system and equations (4)-(6) below identify the orientation of a dynamic position of the vehicle 50, where $R_{dyn}$ is the rotation dynamics matrix of the vehicle 50 in all of pitch, roll and height variation. As is apparent, if the vehicle 50 is under some dynamic change, i.e., pitch, roll and height variation, the calculation of the point $X_C$ in camera coordinates includes the translation vector t and the addition of the rotation matrix R for the dynamic change to the vehicle 50.

$$X_V = X_W + t'_{W2V}, \qquad (1)$$

$$X_{Ci} = R_{V2Ci} * X_V + t'_{V2Ci}, \qquad (2)$$

$$= R_{V2Ci} * X_W + t'_{W2Ci}, \qquad (3)$$

$$X_V = R_{dyn} * (X_W + t'_{W2V}), \qquad (4)$$

$$X_C = R_{V2Ci} * X_V + t'_{V2Ci}, \qquad (5)$$

$$= R_{V2Ci} * R_{dyn} * X_W + t''_{W2Ci}. \qquad (6)$$

Figure 3:
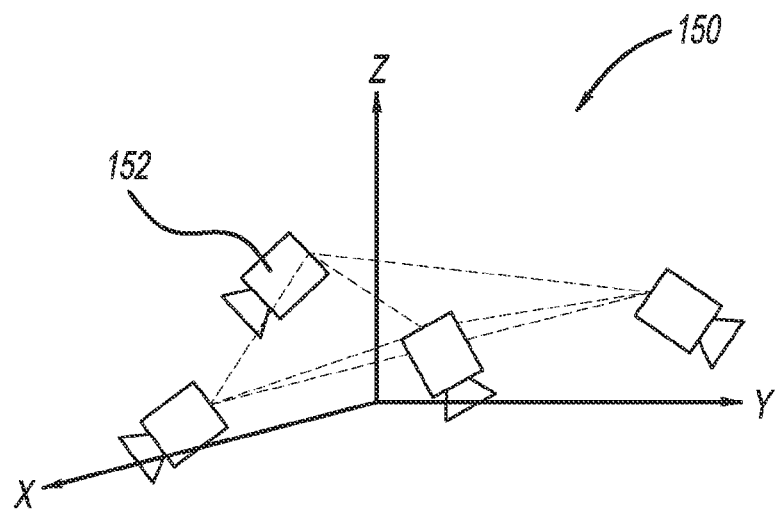
FIG. 3 is a coordinate system showing a surround-view camera system in a stationary position.
Figure 4:
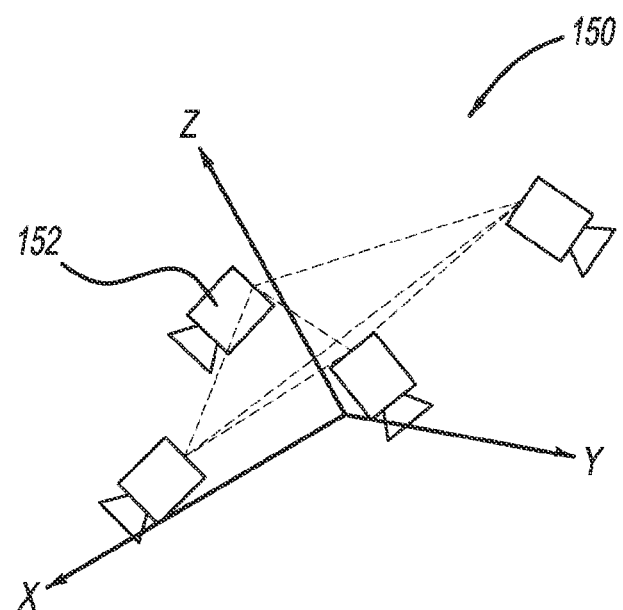
FIG. 4 is the coordinate system shown in FIG. 3 where the coordinate system has been changed as a result of a change in vehicle dynamics.

The cameras 12-18 that are part of the surround-view camera system combine with the vehicle body to form a rigid body frame. FIG. 3 is an illustration 150 of an X, Y and Z coordinate system including four cameras 152 that are part of a surround-view camera system showing such a combined reference frame. FIG. 4 shows the illustration 150 being rotated in pitch and roll, where the rotation matrix and translation vector change accordingly. For this coordinate system, the vehicle dynamics of pitch, roll and height variation are defined by a rotation matrix $R_{veh}$ and a translation vector $T_{veh}$, where the rotation matrix $R_{cam}$ and the translation vector $T_{cam}$ of the cameras 152 are corrected by the change in vehicle dynamics as:

$$(R_{cam}, T_{cam}) = f((R_{veh}, T_{veh}), (R_{cam}, T_{cam})_{stny}). \quad (7)$$

By providing such a correction to the orientation of the surround-view camera system, improved lane sensing, parking assist, etc. can be provided.

The change in the relative orientation of the images from the cameras 12-18 in the surround-view camera system from the calibration of the cameras 12-18 provided at vehicle manufacturer or at the dealer can be used to estimate the vehicle dynamics parameter $R_{dyn}$, namely, rotation dynamics in two-degrees of freedom for pitch α and roll β of the vehicle 50, and translation dynamics in one-degree of freedom, namely, the height offset Δz of the vehicle 50. The present invention also proposes a system and method to estimate vehicle dynamics in this manner that uses the overlap image area for any two of the cameras 12-18 in the surround-view camera system to determine that common points in the overlap image area are not at the same location, assuming the cameras are properly calibrated. The algorithm detects matching feature points (u,v) in the two images, and estimates three-degree of freedom vehicle dynamic parameters from the difference between the feature points (u,v). Providing the matching feature points (u,v) in the images from two cameras are the projection of the same location in world coordinates and solving dynamic equations with the unknowns gives an estimate of the pitch α, roll β and/or height variation of the vehicle 50 based on the distance between the points.

Figure 5:
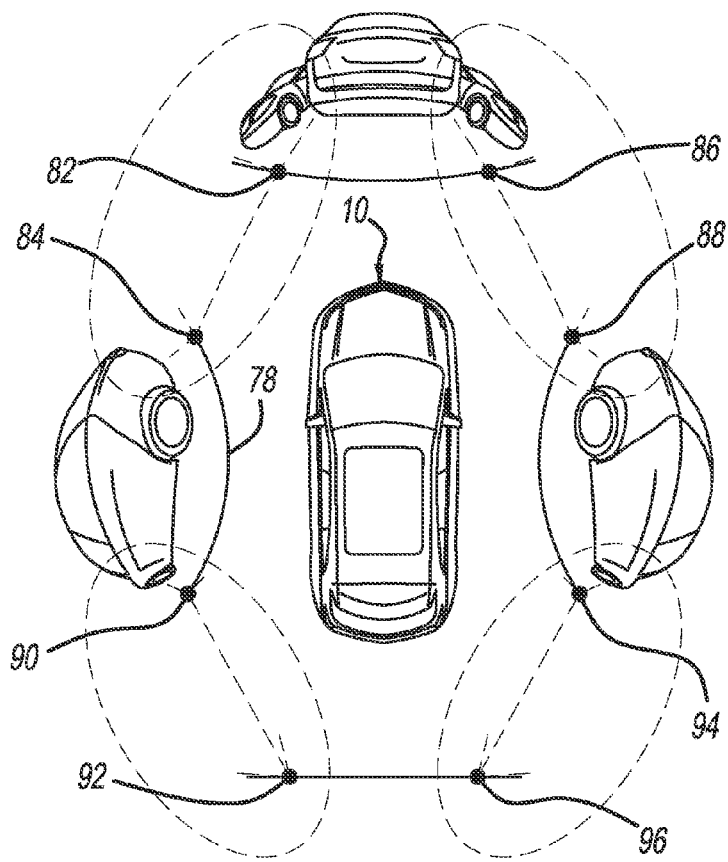
FIG. 5 is a representation of four raw images from four cameras for the surround-view camera system showing matched feature pairs.

FIG. 5 is an illustration 80 of the vehicle 10 in a parking lot adjacent to other vehicles, where parking lot lines 78 can be used to identify the matching feature points (u,v) in two overlapping camera images. The matching feature points (u,v) do not have to be on the ground, but can be on any suitable object above ground or otherwise, such as on the vehicle body. For example, points 82 and 84 represent the same or common point in the overlap area 32 for the images provided by the front camera 12 and the left-side camera 16, respectively. Points 86 and 88 represent the same or common point in the overlap area 34 for the images from the camera 12 and the right-side camera 18, respectively. Points 90 and 92 represent the same or common point the overlap area 36 between the left-side camera 16 and the rear camera 14, respectively. Points 94 and 96 represent the same or common point in the overlap area 38 between the right side camera 18 and the rear camera 14, respectively. The distance between the points 82 and 84, or the points 86 and 88, or the points 90 and 92, or the points 94 and 96 caused by the change in vehicle dynamics provides the mechanism for determining that change in the vehicle dynamics. Those skilled in the art will understand that many computer vision and imaging systems employ feature point detection and matching techniques and algorithms, such as SIFT, SURF, ORB, etc., that may be applicable for the purposes discussed herein.

Figure 6:
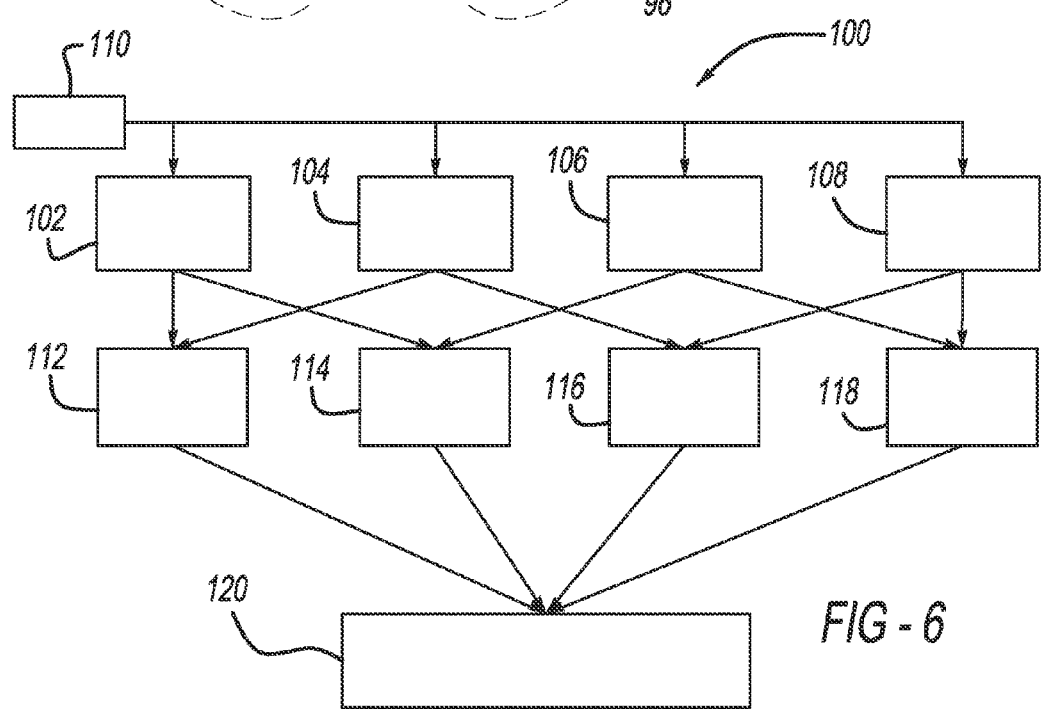
FIG. 6 is a block diagram of a system showing a process for matching feature points.

FIG. 6 is a block diagram of a system 100 showing a general representation of the process for identifying the matching feature points (u,v) in the overlap areas 32, 34, 36 and 38. In the system 100, box 102 represents the image from the front camera 12, box 104 represents the image from the left-side camera 16, box 106 represents the image from the right-side camera 18, and box 108 represents the image from the rear camera 14. A synchronization block 110 synchronizes the timing of the images 102-108 from the cameras 12-18 so that all of the images 32, 34, 36 and 38 are aligned in time before being aligned in space from the calibration process. The images 102 and 104 from the cameras 12 and 16, respectively, generate a region of interest 112 in the overlap area 32, the images 102 and 106 from the cameras 12 and 18, respectively, generate a region of interest 114 in the overlap area 34, the images 104 and 108 from the cameras 16 and 14, respectively, generate a region of interest 116 in the overlap area 36, and the images 106 and 108 from the cameras 14 and 18, respectively, generate a region of interest 118 in the overlap area 38. The regions of interest 112, 114, 116 and 118 are then provided to a processor 120 that identifies the several matching feature points (u,v) in the regions of interest 112, 114, 116 and 118 in the manner as discussed herein.

Equations (8)-(12) below show the process for determining the dynamic rotation matrix $R_{dyn}$ and the translation vector $t'_{W2V}$ that identify a change in the vehicle dynamics using the common matching feature points, which can then be used as an input to other vehicle systems, where equation (8) shows the two feature points in the overlap image area that should be at the same location X when the cameras are calibrated. Suitable algorithms can be employed for this process, such as the Levenberg-Marquardt algorithm, gradient descent algorithms, etc.

$$(u,v)_{C1} \sim (u,v)_{C2}, \quad (8)$$

$$(u,v)_{C1} \rightarrow X_{C1}, \quad (9)$$

$$(u,v)_{C2} \rightarrow X_{C2}, \quad (10)$$

$$X_{C1} = R_{V2C1} * R_{dyn} * (X_W + t'_{W2V}) + t'_{V2C1}, \quad (11)$$

$$X_{C2} = R_{V2C2} * R_{dyn} * (X_W + t'_{W2V}) + t'_{V2C2}, \quad (12)$$

where $(u,v)_{C1}$ is one feature point in an image from a first camera c1 that is a projection of world point $X_W$, $(u,v)_{C2}$ is another feature point in an image from a second camera c2 that is a projection of the world point $X_W$, $R_{V2Ci}$ is the rotation matrix of camera $c_i$ in vehicle coordinates v, i is the index of the cameras, t is the translation vector, dyn represents dynamic, and w is world coordinates.

Figure 7:
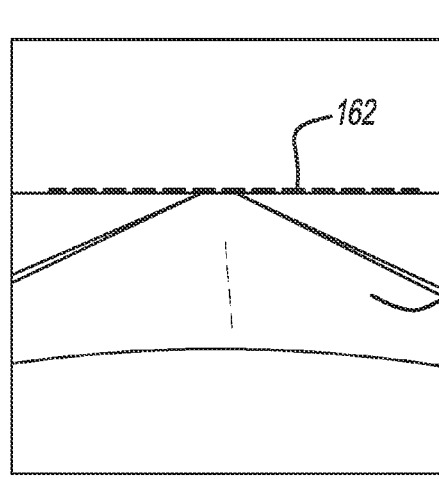
FIG. 7 is a representation of an image from a forward or rearward looking camera on a vehicle showing a horizon line.
Figure 8:
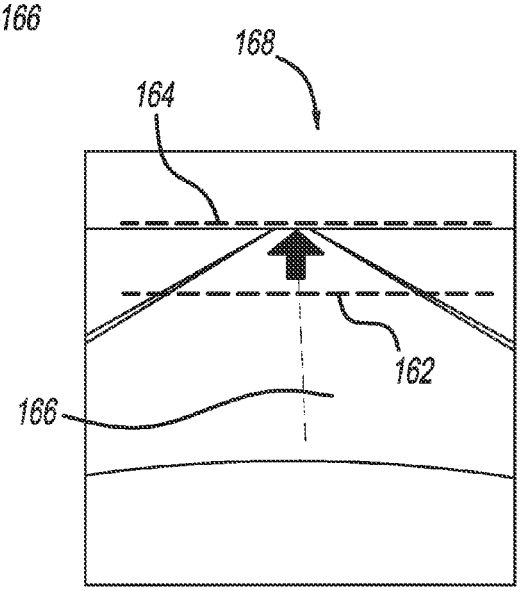
FIG. 8 is an image from a forward or rearward looking camera on a vehicle showing movement of the horizon line when the vehicle pitches down.
Figure 9:
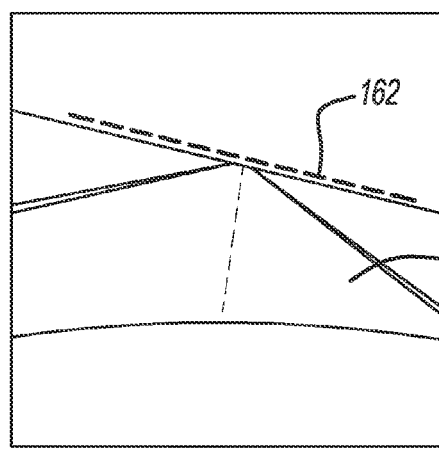
FIG. 9 is a representation of an image from a forward or rearward looking camera on a vehicle where the vehicle is in a roll configuration.
Figure 10:
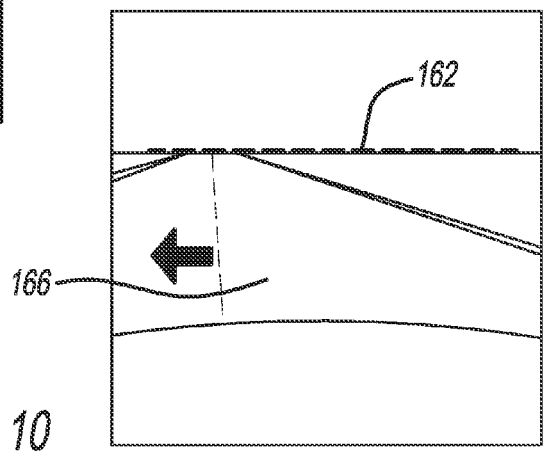
FIG. 10 is a representation of an image from a forward or rearward looking camera on a vehicle showing a drift situation.

As discussed, the cameras 12-18 can be used to determine whether the vehicle 10 is either pitching, rolling or drifting relative to a horizon. For example, FIG. 7 is a representation of an image 160 from a camera on the vehicle 10 traveling along a roadway 166 in front of the vehicle 10 and defining the non-dynamic horizon between air and ground by dotted line 162, where the vehicle 10 is not exhibiting roll, pitch or height variation. FIG. 8 is a representation of an image 168 including the non-dynamic horizon line 162, but where the actual horizon is now at line 164 showing that the vehicle 10 has pitched down. FIG. 9 is a representation of an image 170 of the roadway 166 where the horizon line 162 is shown angled in a roll direction. FIG. 10 is a representation an image 172 where the vehicle 10 has drifted on the roadway 166 in a left direction.

In addition, the process of determining the vehicle dynamics based on changes in the surround-view image can include temporal tracking and smoothing. The temporal tracking and smoothing can be provided for non-transient vehicle change detection, such as a flat tire, bad suspension, towing and heavy load. Further, the tracking can be performed to detect dangerous vehicle dynamic changes, such as roll over detection and prevention, zigzag driving, etc. If the roll or pitch dynamics change aggressively anti-roll systems or other vehicle system can be notified to take corrective action.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for estimating vehicle dynamics using images from cameras in a surround-view camera system on a vehicle, said method comprising:
   providing digital images from the cameras to a processor;
   identifying one or more overlap image areas for any two cameras in the surround-view camera system;
   identifying, using the processor, common feature points in the one or more overlap image areas;
   determining, using the processor, that the identified common feature points are not at the same location in the overlap image areas;
   estimating, using the processor, three-degree of freedom vehicle dynamic parameters from comparisons between the common feature points; and
   estimating, using the processor, vehicle dynamics of one or more of pitch, roll and height variation using the vehicle dynamic parameters.

2. The method according to claim 1 wherein identifying common feature points includes identifying a region of interest in the overlap image areas that includes the common feature points.

3. The method according to claim 1 wherein identifying common feature points includes identifying common feature points in the images from two cameras that are projections of the same point location in world coordinates.

4. The method according to claim 1 wherein estimating vehicle dynamics includes solving dynamic equations to obtain an estimate of the pitch, roll and/or height variation of the vehicle based on a difference between the common feature points.

5. The method according to claim 1 wherein estimating vehicle dynamics includes determining a rotation matrix and a translation vector.

6. The method according to claim 5 wherein estimating vehicle dynamics includes using the equations:

$$(u,v)_{C1} \sim (u,v)_{C2},$$

$$(u,v)_{C1} \rightarrow X_{C1},$$

$$(u,v)_{C2} \rightarrow X_{C2},$$

$$X_{C1} = R_{V2C1} * R_{dyn} * (X_W + t'_{W2V}) + t'_{V2C1},$$

$$X_{C2} = R_{V2C2} * R_{dyn} * (X_W + t'_{W2V}) + t'_{V2C2},$$

where $(u,v)_{C1}$ is one feature point in an image from a first camera c1 that is a projection of world point $X_W$, $(u,v)_{C2}$ is another feature point in an image from a second camera c2 that is a projection of the world point $X_W$, $R_{V2Ci}$ is the rotation matrix of camera $c_i$ in vehicle coordinates v, i is the index of the cameras, t is the translation vector, dyn represents vehicle dynamic, and w is world coordinates.

7. The method according to claim 1 wherein estimating vehicle dynamics includes providing temporal tracking and smoothing.

8. The method according to claim 1 wherein the surround-view camera system includes four cameras, wherein a first camera is positioned at a front of the vehicle, a second camera is positioned at a back of the vehicle, a third camera is positioned at a left side of the vehicle and a fourth camera is positioned at a right side of the vehicle.

9. The method according to claim 8 wherein images from the first camera overlap with images from the third camera, images from the first camera overlap with images from the fourth camera, images from the second camera overlap with images from the third camera, and images from the second camera overlap with images from the fourth camera.

10. A method for estimating platform dynamics using images from cameras on a mobile platform, said method comprising:
    providing digital images from the cameras to a processor;
    identifying one or more overlap image areas for any two cameras;
    identifying, using the processor, common feature points in the one or more overlap image areas;
    determining, using the processor, that the identified common feature points in the overlap image areas are not at the same location in the overlap image areas;
    estimating, using the processor, three-degree of freedom dynamic parameters from comparisons between the common feature points; and
    estimating, using the processor, platform dynamics of one or more of pitch, roll and height variation using the dynamic parameters.

11. The method according to claim 10 wherein identifying common feature points includes identifying common feature points in the images from two cameras that are projections of the same point location in world coordinates.

12. The method according to claim 10 wherein identifying common feature points identifying a region of interest in the overlap image areas that includes the common feature points.

13. The method according to claim 10 wherein estimating platform dynamics includes solving dynamic equations to obtain an estimate of the pitch, roll and/or height variation of the platform based on a difference between the common feature points.

14. The method according to claim 10 wherein estimating platform dynamics includes determine a rotation matrix and a translation vector.

15. The method according to claim 10 wherein the plurality of cameras are part of a surround-view camera system.

16. The method according to claim 15 wherein the surround-view camera system includes four cameras, wherein a first camera is positioned at a front of the platform, a second camera is positioned at a back of the platform, a third camera is positioned at a left side of the platform and a fourth camera is positioned at a right side of the platform.

17. The method according to claim 16 wherein images from the first camera overlap with images from the third camera, images from the first camera overlap with images from the fourth camera, images from the second camera overlap with images from the third camera, and images from the second camera overlap with images from the fourth camera.

18. A dynamics system for estimating vehicle dynamics using images from cameras in a surround-view camera system on a vehicle, said system comprising:
 means for providing digital images from the cameras to a processor;
 means for identifying one or more overlap image areas for any two cameras in the surround-view camera system;
 means for identifying, using the processor, common feature points in the one or more overlap image areas;
 means for determining, using the processor, that the identified common feature points are not at the same location in the overlap image areas;
 means for estimating, using the processor, three-degree of freedom vehicle dynamic parameters from comparisons between the common feature points; and
 means for estimating, using the processor, vehicle dynamics of one or more of pitch, roll and height variation using the vehicle dynamic parameters.

19. The system according to claim 18 wherein the means for identifying common feature points identifies a region of interest in the overlap image areas that includes the common feature points.

20. The system according to claim 18 wherein the means for identifying common feature points identifies common feature points in the images from two cameras that are projections of the same point location in world coordinates.

* * * * *